(12) United States Patent
Kline

(10) Patent No.: US 10,609,875 B2
(45) Date of Patent: Apr. 7, 2020

(54) TREE STUMP REMOVAL DEVICE

(71) Applicant: J & S FABRICATION, INC., Grantville, PA (US)

(72) Inventor: James E. Kline, Grantville, PA (US)

(73) Assignee: J & S Fabrication, Inc., Grantville, PA (US)

( * ) Notice: Subject to any disclaimer, the term of this patent is extended or adjusted under 35 U.S.C. 154(b) by 252 days.

(21) Appl. No.: 15/881,886

(22) Filed: Jan. 29, 2018

(65) Prior Publication Data

US 2018/0146630 A1    May 31, 2018

Related U.S. Application Data

(60) Division of application No. 14/537,412, filed on Nov. 10, 2014, now Pat. No. 9,913,435, which is a continuation-in-part of application No. 12/939,371, filed on Nov. 4, 2010, now abandoned.

(51) Int. Cl.
*A01G 23/06* (2006.01)

(52) U.S. Cl.
CPC .......... *A01G 23/065* (2013.01); *A01G 23/067* (2013.01)

(58) Field of Classification Search
CPC .... A01G 23/06; A01G 23/062; A01G 23/065; A01G 23/067
See application file for complete search history.

(56) References Cited

U.S. PATENT DOCUMENTS

| | | | |
|---|---|---|---|
| 1,012,962 A | 12/1911 | Anderson | |
| 1,114,505 A | 10/1914 | Moore | |
| 1,406,187 A | 2/1922 | Herdlitchka | |
| 2,478,233 A | 8/1949 | Brown | |
| 3,307,643 A | 3/1967 | Ferri | |
| 4,068,396 A | 1/1978 | Langguth | |
| 4,445,557 A | 5/1984 | Peters, III | |
| 4,481,989 A | 11/1984 | Peters | |
| 4,530,385 A | 7/1985 | York | |
| 4,616,965 A | 10/1986 | Anderson et al. | |
| 4,637,442 A | 1/1987 | Mozer | |
| 4,783,914 A | 11/1988 | Bowling | |
| 4,827,995 A | 5/1989 | Wilson | |
| 4,893,783 A | 1/1990 | Diener et al. | |
| 4,998,573 A | 3/1991 | York | |
| 5,269,355 A | 12/1993 | Bowen | |
| 5,466,099 A | 11/1995 | Sullivan et al. | |
| 5,921,302 A | 7/1999 | Petersen | |
| 6,786,684 B1 | 9/2004 | Ecker | |
| 6,848,485 B1 | 2/2005 | Paumier et al. | |
| 7,007,730 B2 | 3/2006 | Wildey | |
| 2005/0084349 A1 | 4/2005 | Kammerer et al. | |
| 2005/0105981 A1 | 5/2005 | Byrley et al. | |

(Continued)

FOREIGN PATENT DOCUMENTS

| | | |
|---|---|---|
| EP | 2077069 A1 | 7/2009 |
| GB | 695709 | 8/1953 |
| GB | 2217163 A | 10/1989 |

(Continued)

*Primary Examiner* — Matthew Katcoff
(74) *Attorney, Agent, or Firm* — Breiner & Breiner, L.L.C.

(57) ABSTRACT

A tree stump removal device is disclosed. The device includes an annular housing having cutters attached thereto. A method of removing a tree stump is disclosed that includes lowering a tree stump removal device into the ground surrounding the tree stump to sever some of the horizontal roots extending from the tree stump.

8 Claims, 13 Drawing Sheets

(56) References Cited

U.S. PATENT DOCUMENTS

2009/0229887 A1   9/2009   Tedeschi

FOREIGN PATENT DOCUMENTS

| GB | 2364662 A | 2/2002 |
|---|---|---|
| WO | 8704969 A1 | 8/1987 |
| WO | 03011403 A1 | 2/2003 |
| WO | 2007067105 A1 | 6/2007 |

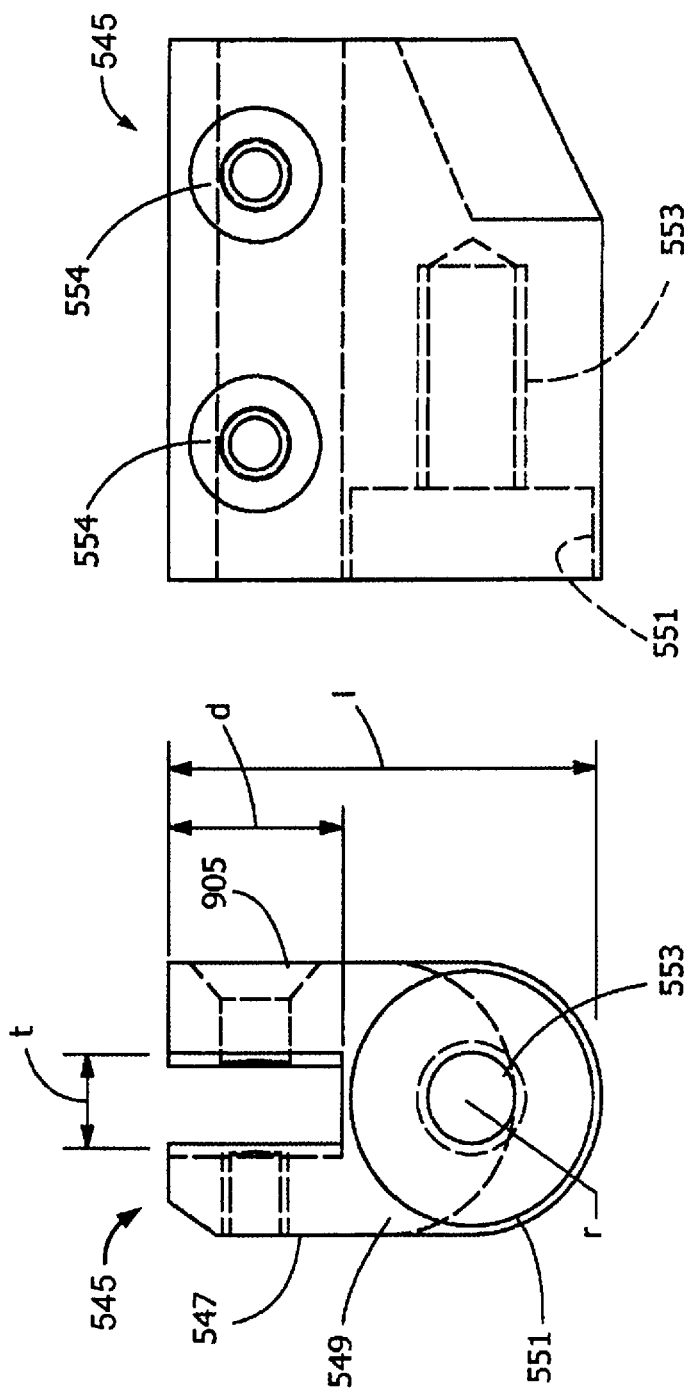

TREE STUMP REMOVAL DEVICE

RELATED APPLICATIONS

The present application claims the benefit of U.S. Ser. No. 14/537,412 filed Nov. 10, 2014, which in turn claims benefit of U.S. Ser. No. 12/939,371 filed Nov. 4, 2010, now abandoned, which are each incorporated herein by reference.

FIELD OF THE INVENTION

The present invention relates generally to tree stump removal devices. It relates more particularly to a tree stump removal device that severs the surrounding root system from a stump.

BACKGROUND OF THE INVENTION

It has long been a problem to remove the remaining tree stump from the ground once the tree trunk has been severed there from. This problem exists for both professional tree services including orchardists, foresters and landscapers as well as the everyday homeowner. Present stump removal methods are costly and most often remove the tree stump without removing the roots. Another disadvantage of present methods is that they often disturb a large area of soil around the tree stump.

The present disclosure is directed to overcoming one or more of the problems set forth above.

SUMMARY OF THE INVENTION

The present disclosure relates to a tree stump removal device including a tubular body having a predetermined length extending from a first end to a second end, a cap attached to the first end, and cutters connected to the second end of the tubular body. The cutters may be integral with the second end of the tubular body or may be mechanically attached to the second end of the tubular body. The cap includes a releasable coupling that can be attached to a power rotational device to operate the tree stump removal device.

The present disclosure further relates to a tree stump removal device including a tapered tubular body comprising a length extending from a first end to a second end, a cap removably attached to the first end, and cutters connected to the second end.

The present disclosure further relates to a method of tree stump removal including cutting a circular slot with a tree stump removal device around a tree stump to a predetermined depth into ground around the tree stump.

One advantage of the present disclosure is to provide an improved tree stump removal device that severs all or some of the roots horizontally extending from the tree stump.

Another advantage of the present disclosure is to provide a tree stump removal device that is simple to operate and economical to manufacture.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 6A depicts a side view of a cutter holder as part of the cutter assembly.

FIG. 6B depicts a front view of the cutter holder of FIG. 6A.

Whenever possible, the same reference numbers will be used throughout the drawings to refer to the same or like parts.

DETAILED DESCRIPTION OF THE INVENTION

Figure 1:
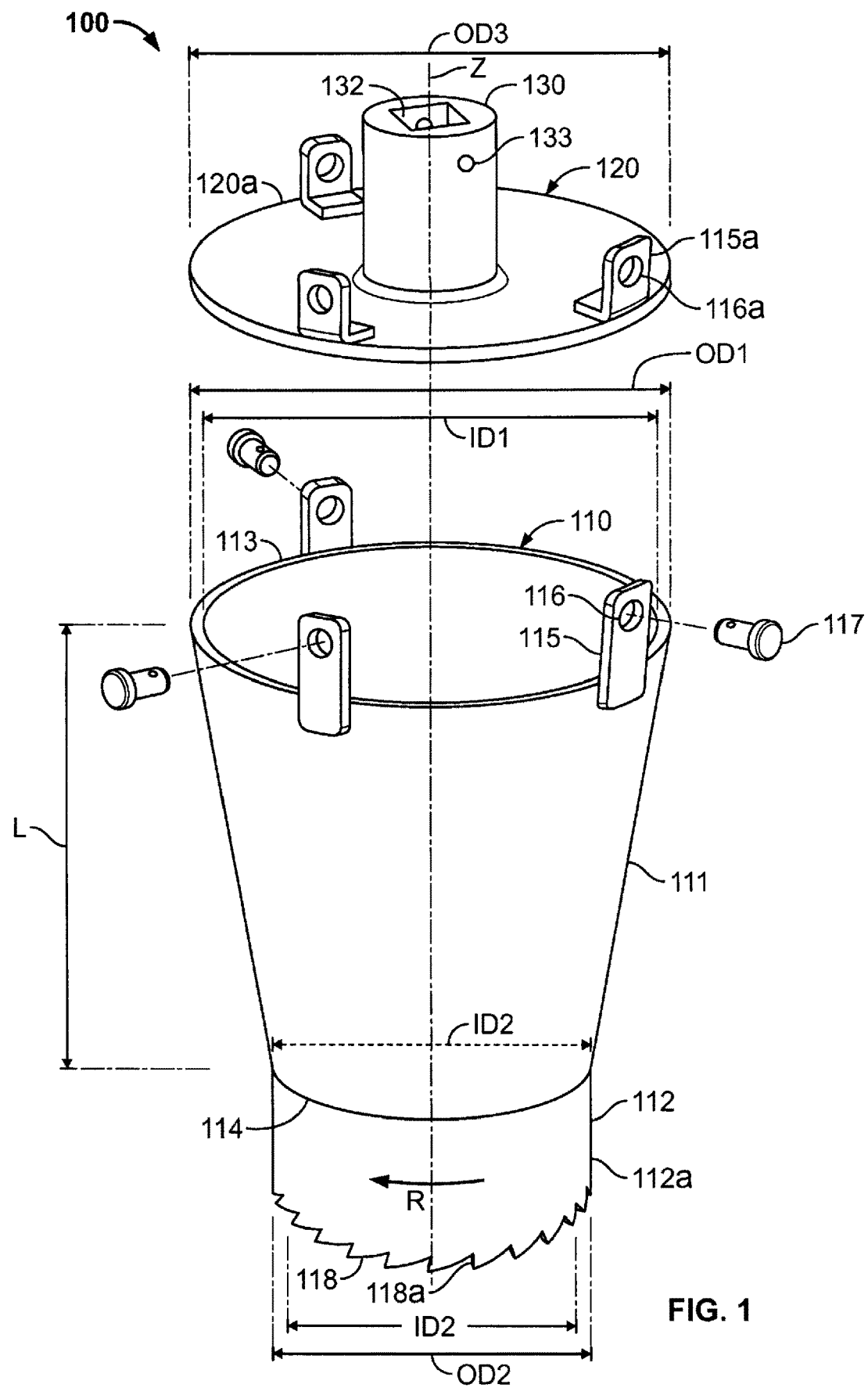
FIG. 1 is a perspective view of an exemplary embodiment of a tree stump removal device according to the invention.

FIG. 1 shows an exemplary embodiment of a tree stump removal device 100 according to the invention. As can be seen in FIG. 1, the tree stump removal device 100 includes a body portion 110 and a top portion or cap 120. The body portion 110 includes a housing portion 111 and a cutting portion 112.

The housing portion 111 may have a generally tapered tubular shape having a length L extending from a top end 113 to a bottom end 114. The housing portion 111 has a first outside diameter OD1 at the top end 113 and a second outside diameter OD2 at the bottom end. The housing portion 111 further has a first inside diameter ID1 at the top end and a second inside diameter ID2 at the bottom end 114. ID1 is greater than ID2. The change in diameter from ID1 to ID2 is proportional to L. In one embodiment, the ratio of decreasing diameter to length is between about 0.125:12 to about 2.0:12. In another embodiment, the ratio of decreasing diameter to length is between about 0.25:12 to about 1.0:12. In yet another embodiment, the ratio of decreasing diameter to length is between about 0.5:12 to about 0.75:12. In yet another embodiment, the housing portion 111 may have a constant internal diameter over L. In yet another embodiment, the housing portion 111 may have a discontinuous internal diameter over L. The housing portion 111 may be formed of a metal, metal alloy or composite, such as, but not limited to ferrous or nonferrous metals, and composites, such as, but not limited to a steel or aluminum alloy.

The housing portion 111 further includes tabs 115. The tabs 115 include openings 116 for receiving fasteners 117. In this exemplary embodiment, the tabs 115 are joined to the housing portion 111. The tabs 115 may be joined to the housing portion 111 by brazing, welding or other metal joining technique. In another embodiment, the tabs 115 may be an integral part of the housing portion 111. As used herein, the term "integral part" and "integral to" means that the portion is a part of the initial forming of the part. In yet another embodiment, the housing portion 111 does not include tabs 115, and the openings 116 are integral to the housing portion 111. The housing portion 111 includes three tabs 115. In another embodiment, the housing portion 111 may include two or more tabs 115. The fasteners 117 may be, but is not limited to, pin, bolts, screws or other similar devices.

The cutting portion 112 is fixed to the housing portion 111. The cutting portion 112 includes a cutting portion body 112a and cutters 118. The cutting portion 112a may be fixed to the housing portion 111 by a metal joining technique, such as, but not limited to brazing and welding. In another embodiment, the cutting portion 112a may be integral to the housing portion 111. The cutting portion 112 may be formed of the same or different material as the main portion 114. The cutting portion 112 has a same or approximately the same second inside diameter ID2 as the housing portion 111 at bottom end 114 of the housing portion 111.

In this exemplary embodiment, cutters 118 may be cutting teeth formed into the cutting portion body 112a. The cutters 118 may be integrally formed into the cutting portion 112 by cutting, grinding, machining or other metal forming method. In another embodiment, cutters 118 may be projections, inserts, attachments, or other frictional devices formed as an integral part of the cutting portion body 112a. In yet another embodiment, the cutters may be mechanically fastened to the cutting portion body 112a. In still another embodiment, the cutters may be integrally attached to the cutting portion body 112a by metallurgically joining the cutting portion to the cutting portion body 112a. For example, a cutting portion may be metallurgically joined by welding a separate cutting insert to the cutting portion body 112a. Alternatively, the cutting portion also may be provided metallurgically by hard facing projections in the cutting portion body with a wear resistant hard facing material such as stellite. In an embodiment, cutters 118 may be joined to the cutting portion body 112a by a material joining technique, such as, but not limited to brazing or welding.

In one embodiment, the cutters 118 are directional, or in other words, pitched to cut in a particular rotational direction R of the tree stump removal device 100. In another embodiment, the cutters 118 may be bi-directional.

The cutters 118 include a cutting face or surface 118a. In one exemplary embodiment, the cutting surface 118a is the exposed surface of the cutters 118. In another embodiment, the cutting surface 118a may be hardfaced with an appropriate hardfacing material. In another embodiment, the cutting surface 118a be a surface of an insert, bit, or other attachment, that is attached, mechanically fastened or otherwise joined to the cutters 118.

The cap 120 includes a cap body 120a and a coupling 130. The cap body 120a may include optional openings (not shown, but shown as 460 in FIG. 4A). The cap 120 is capable of joining to the housing portion 111. The cap 120 has an outside diameter OD3. In this exemplary embodiment OD3 is approximately equal to OD1. In another embodiment, OD3 may be larger or smaller than ODI. For example, OD3 may be approximately equal to ID1. The cap 120 includes cap tabs 115A that correspond to tabs 115. The cap tabs 115A have openings 116A that correspond to openings 116. In one embodiment, the openings 116a may be threaded. In such a manner openings 116 and 116A are aligned when the cap 120 is joined to the housing portion 111. The cap tabs 115A may be joined to the cap 120 by brazing, welding or other metal joining technique, or the cap tabs 115 may be an integral part of the cap 120. In yet another embodiment, the cap 120 is joined to the housing portion 111 by welding, brazing, or other metallurgical bonding technique, and no mechanical fastener is required.

The coupling 130 is attached to the cap body 120a. In one embodiment, the coupling 130 is joined to the cap body 120a by a metal joining technique, such as, but not limited to, brazing or welding. In another embodiment, the coupling 130 is integral to the cap body 120a. The coupling 130 includes a recess 132 and an opening 133 through the coupling 130 that traverses the recess 132. In this exemplary embodiment, the coupling 130 is a standard power take-off (PTO) coupling. In another embodiment, the opening 133 receives a pin (not shown) for temporarily locking a PTO in the recess 132. The power take-off coupling may be connected to a tractor or drive of a vehicle or power equipment. In another embodiment, the coupling 130 may be a coupling capable of releasably connecting to a rotational and/or vibrational mechanical power device, such as, but not limited to a power take-off, drill or other power rotational device.

Figure 2A:
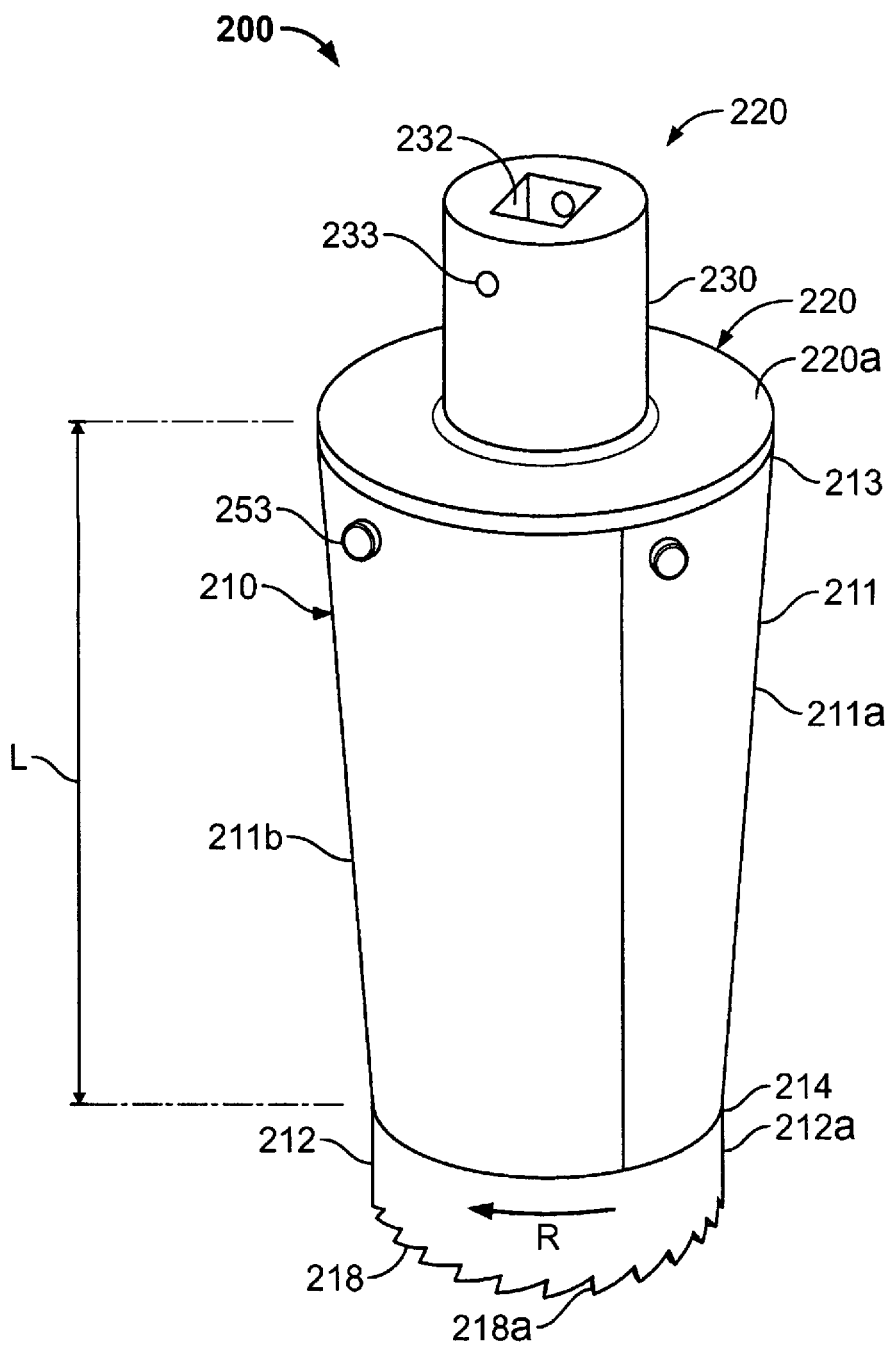
FIG. 2A is a perspective view of another embodiment of a tree stump removal device.
Figure 2B:
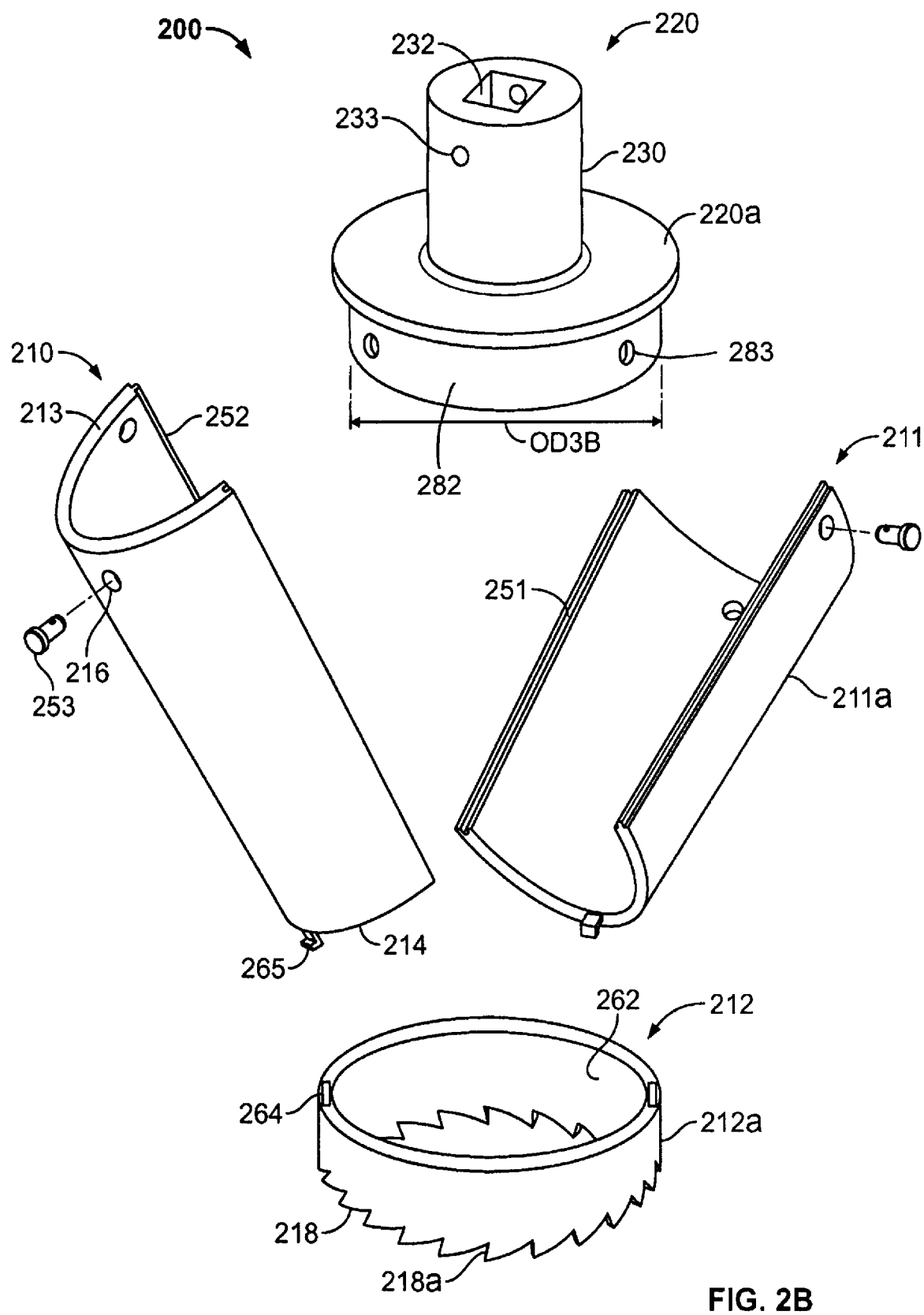
FIG. 2B is a perspective view of the tree stump removal device shown in FIG. 2A disassembled.

FIGS. 2A and 2B shows a another embodiment of a tree stump removal device 200 according to the invention. As can be seen in FIG. 2, the tree stump removal device 200 includes a body 210 and a top portion or cap 220. The body 210 includes a housing or housing portion 211 and a cutting portion 212. The housing portion 211 includes a first portion 211a and a second housing portion 211b. The first housing portion 211a and the second housing portion 211b have a groove 251 and tongue or projection 252, respectively, for aligning and stabilizing the first and second housing portions 211a, 211b during assembly. The first and second housing portions 211a, 211b include openings 216 for receiving fasteners 253. In another embodiment, the openings 216 may be omitted.

When assembled as shown in FIG. 2A, the housing portion 211 has a generally tapered tubular shape having a length L extending from a top end 213 to a bottom end 214. The housing portion 211 has a first outside diameter OD1 at the top end 213 and a second outside diameter OD2 at the bottom end 214, that are similar to those shown in FIG. 1. The housing portion 211 further has a first inside diameter ID1 at the top end and a second inside diameter ID2 at the bottom end 214 similar to those shown in FIG. 1. In this exemplary embodiment, ID1 is greater than ID2. The change in diameter from ID1 to ID2 is proportional to L. In one embodiment, the ratio of decreasing diameter to length is between about 0.125:12 to about 2.0:12. In another embodiment, the ratio of decreasing diameter to length is between about 0.25:12 to about 1.0:12. In yet another embodiment, the ratio of decreasing diameter to length is between about 0.5:12 to about 0.75:12. In yet another embodiment, the housing portion 211 may have a constant internal diameter over L, or in other words ID1 is equal to ID2. In yet another embodiment, the housing portion 211 may have a discontinuous internal diameter over L. The housing portion 211 may be formed of a metal, metal alloy or composite, such as, but not limited to ferrous or nonferrous metals, and composites, such as, but not limited to a steel or aluminum alloy.

The cutting portion 212 is attached to or integral with and extends from the bottom end 214 of the housing portion 211. The cutting portion includes a slot 264 that receives a corresponding protrusion 265 of the main portion 211 to fasten or join the cutting portion 212 and body portion 211 together. In another embodiment and cutting portion 212 and main portion 211 may be joined by a fastener, such as, but not limited to a pin, bolt, or clip.

The cutting portion 212 includes a cutting portion body 212a and cutters 218. The cutters 218 may be referred to as cutting teeth. The cutting portion 212 has a same or approximately the same second inside diameter ID2 as the bottom end 214 of the housing portion 211. In this exemplary embodiment, the cutters 218 are formed into the cutting portion 212. The cutters 218 may be formed into the cutting portion 212 by cutting, grinding or other metal forming method. In this embodiment, the cutters 218 are directional, or in other words, pitched to cut in a particular rotational direction R of the tree stump removal device 200. In another embodiment, the cutters 218 may be bi-directional. In another embodiment, the cutters 218 may be hardfaced with an appropriate hardfacing material. In another embodiment, the cutters 218 may be inserts or bits joined to the cutting portion 212 by a metal joining technique, such as, but not limited to, brazing or welding.

The cutters 218 include a cutting face or surface 218a. In this exemplary embodiment, the cutting surface 218a is the exposed surface of the cutters 218. In another embodiment, the cutting surface 218a may be hardfaced with an appropriate hardfacing material. In another embodiment, the cutting surface 218a be a surface of an inserts or the like that are attached, fastened or otherwise joined to the cutters 218.

The cap 220 includes a cap body 220a, a coupling 230, and an insertion portion 282. The cap 220 is capable of joining to the main portion 211. The insertion portion 282 includes holes 283 that correspond to openings 216. The holes 283 are threaded to receive a threaded fastener 253, such as, but not limited to a bolt and screw, to releasably fasten the first and second main portions 211a, 211b to the cap 220. In another embodiment, the first and second main portions 211a, 211b may be releasably attached to the cap 220 by any suitable releasable fastener including, but not limited to, tabs, pins, and couplings. The insertion portion 282 has an outside diameter OD3B. In this exemplary embodiment OD3 is approximately equal to the interior diameter ID1 (FIG. 1) of the assembled main portion 213 at the top end 213.

The coupling 230 is attached to the cap body 220a. In one embodiment, the coupling 230 is joined to the cap body 220a by a metal joining technique, such as, but not limited to, brazing or welding. In another embodiment, the coupling 230 is integral to the cap body 220a. The coupling 230 includes a recess 232 and an opening 233. In this exemplary embodiment, the coupling 230 is standard power take-off (PTO) coupling. In another embodiment, the opening 233 receives a pin (not shown) for temporarily locking a PTO in the recess 232. The power take-off coupling may be connected to a tractor or drive of a vehicle or power equipment. In another embodiment, the coupling 230 may be a coupling capable of releasably connecting to a rotational device, such as, but not limited to a rotational mechanical power device, such as, but not limited to a power take-off, a drill or other power rotational device. The coupling 230 may be joined to the cap body 220a by brazing, welding or other metal joining technique, or the coupling 230 may be an integral part of the cap 220.

Figure 3A:
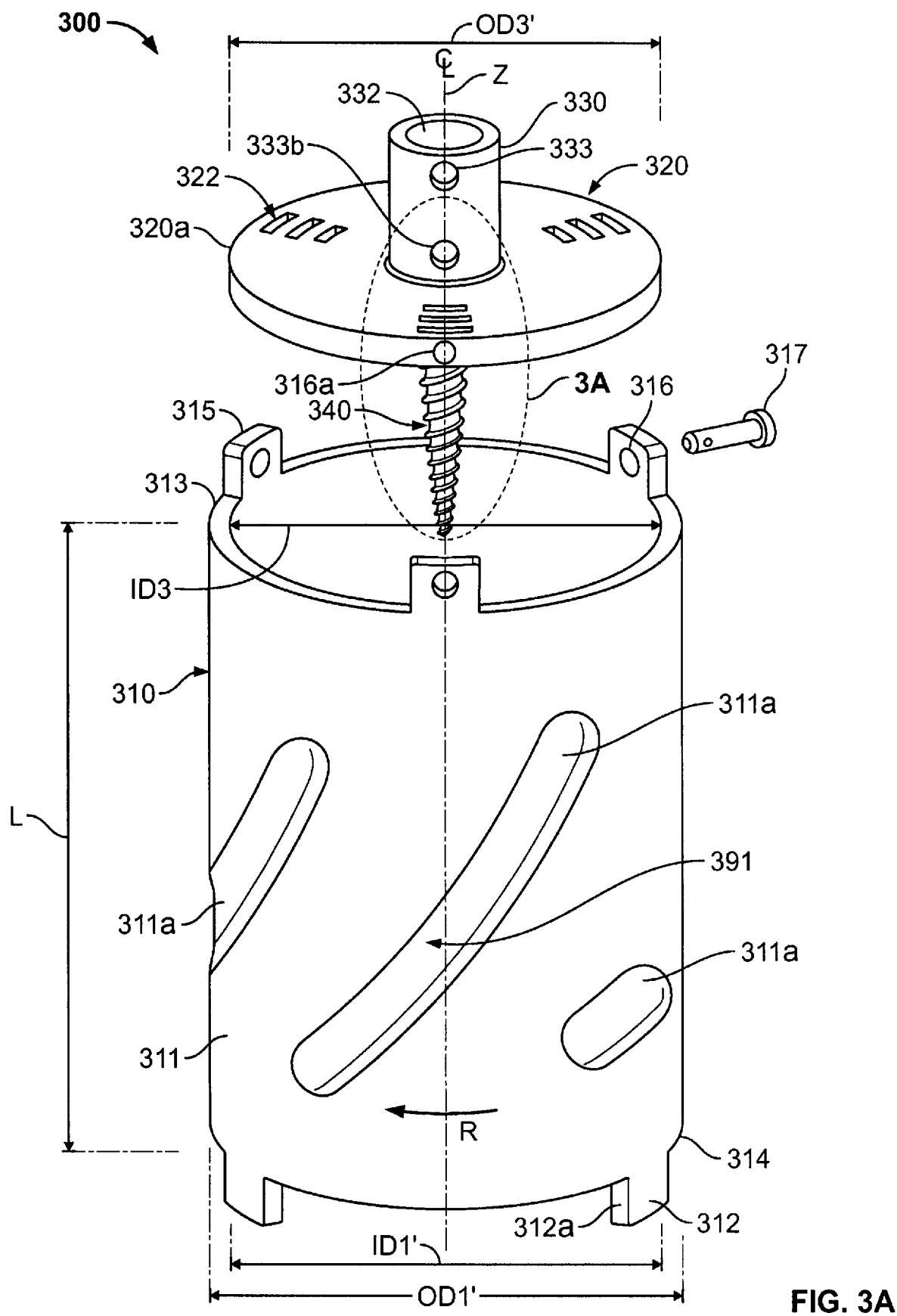
FIG. 3A is a perspective view of another embodiment of a tree stump removal device shown disassembled.
Figure 3B:
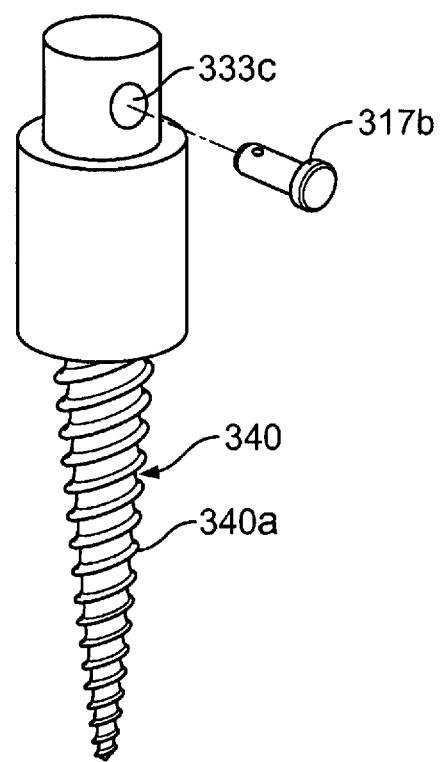
FIG. 3B is a perspective view of a partial section of FIG. 3A.

FIGS. 3A and 3B show another embodiment of a tree stump removal device 300 according to the invention. As can be seen in FIGS. 3A and 3B, the tree stump removal device 300 includes a body portion 310 and a top portion or cap 320. The body 310 includes a housing portion 311 and a cutting portion 312. The housing portion 311 has a preselected length L extending from a top end 313 to a bottom end 314. The main portion 311 includes slots 311a that pass through to an interior space 391 defined by the main portion 311. In this embodiment, the main portion 311 includes three slots 311a. In another embodiment, the main portion 311 may include one or more slots 311a.

The housing 311 further includes tabs 315 having openings 316 for receiving fasteners 317. In this exemplary embodiment, the housing 311 has a constant internal diameter ID1' over the length L of the housing portion extending from the top end 314 to the bottom end 314. In another embodiment, the housing 311 may have a discontinuous internal diameter ID1' over L. In yet another embodiment, the housing 311 may have a decreasing, tapered internal diameter from the top end 313 to the bottom end 314.

The cutting portion 312 is joined to the bottom end 214 of housing 311. In this exemplary embodiment, the cutting portion 312 are projections or cutters that have been formed from a portion of the housing 311. In one embodiment, the cutting portion 312 may be hardfaced. In this exemplary embodiment, the cutting portion 312 includes three cutters (one cutter hidden in rear). In another embodiment, the cutting portion 312 may include one or more cutters. In another embodiment, the cutting portion 312 may be joined by a metal joining technique such as, but not limited to brazing or welding. In one embodiment, the cutting portion 312 includes a cutting portion body joined to the main body 311 to which teeth or cutters are joined.

The cap 320 includes a cap body 320a, a coupling 330, and a core screw 340. The cap 320 is capable of joining to the housing 311. The cap body 320a includes slots or openings 322 for receiving tabs 315 and holes or fastener openings 316a for receiving a fastener 317. The fastener 317 may be a bolt, pin, hitch pin, or other engaging device for securing the cap 320 to the body 310. The fastener 317 may be threaded or unthreaded. The cap body 320 includes openings 322 radially distributed at different radius from the centerline or vertical axis Z of the tree stump removal device 300. In such a manner, the cap 320 may be releasably attached to a body 310 of various diameters.

The coupling 330 includes a recess 332 and an opening 333. In this exemplary embodiment, the coupling 330 is a power take-off (PTO) coupling. In another embodiment, the opening 333 receives a pin (not shown) for temporarily locking a PTO in the recess 332. The power take-off coupling may be connected to a tractor or drive of a vehicle or power equipment. In another embodiment, the coupling 330 may be a coupling capable of releasably connecting to a rotational device, such as, but not limited to a rotational mechanical power device, such as, but not limited to a power take-off, drill or other power rotational device. The coupling 330 may be joined to the cap body 320a 320 by brazing, welding or other metal joining technique, or the coupling 330 may be an integral part of the cap 320.

The core screw 340 is received in the opening 332. The core screw is releasably attached within the opening 332 by a fastener 317b received through openings 333b and 333c. The fastener may be a bolt, pin, hitch pin, or other engaging device for releasably engaging the core screw 340 to the coupling 330. In another embodiment, the core screw 340 may be omitted. In yet another embodiment, the core screw 340 and the opening 333b may be omitted. The core screw 340 includes a threaded portion 340a for releasably engaging a material, such as a tree stump, in the interior of the main portion 311a. In such a manner, the core screw 340 may engage and extract a tree stump from the ground after the cutting portion 312 cuts and/or severs roots extending from the tree trunk.

Figure 4A:
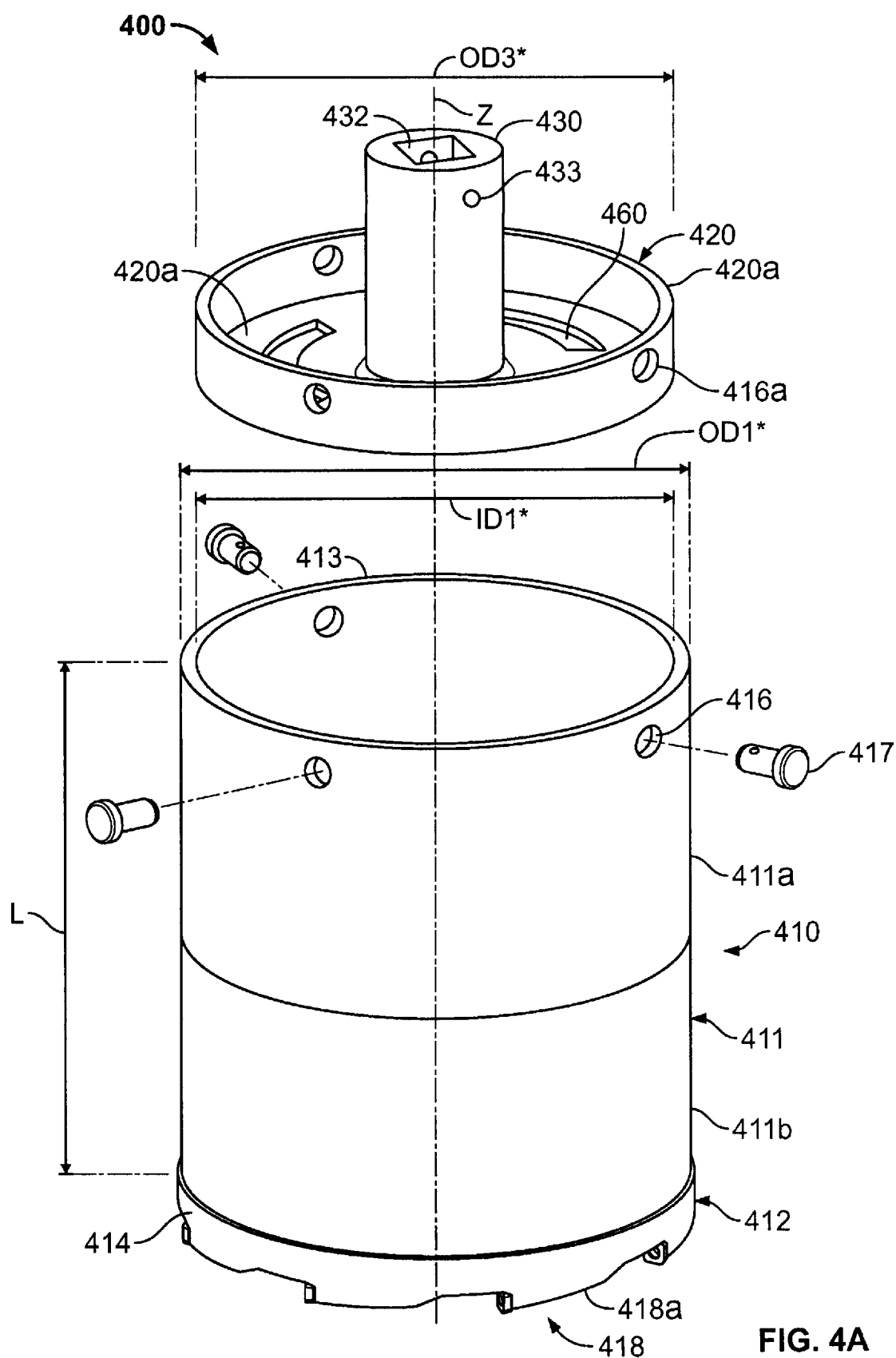
FIG. 4A is a perspective view of another embodiment of a tree stump removal device according to the invention.

FIG. 4A illustrates another exemplary embodiment of a tree stump removal device 400. As can be seen in FIG. 4A, the tree stump removal device 400 includes a body portion 410 and a top portion or cap 420. The body portion 410 includes a housing portion 411 and a cutting portion 412. The housing portion 411 has a generally cylindrical tubular shape having a length L extending from a top end 413 to a bottom end 414. The body portion 411 has an outside diameter OD1* and an inside diameter ID1*.

The housing portion 411 includes a first housing portion 411a and a second housing portion 411b. The first and second housing portions 411a, 411b are joined by a material joining technique, such as, but not limited to welding or brazing. In another embodiment, the first and second housing portions 411a, 411b may be joined by mechanical fastening. In another embodiment, the housing portion 411 is a single, unitary body. In yet another embodiment, the housing portion 411 is formed to two or more body portions. The housing portion 411 further includes openings 416 for receiving fasteners 417. In this exemplary embodiment, the housing portion 411 includes three openings 416. In another embodiment, the housing portion 411 may include two or more openings 416. The fasteners 417 may be, but is not limited to, a pin, bolt or screw. The housing portion 411 may be formed of a metal, metal alloy or composite, such as, but not limited to ferrous or nonferrous metals, and composites. For example, the housing portion 411 may be formed of steel or aluminum alloy.

The cap 420 includes a cap body 420a and a coupling 430. The cap 420 is capable of joining to the housing portion 411. The cap 420 has an outside diameter OD3*. In this exemplary embodiment OD3* is approximately equal to or slightly less than ID1* so that the cap body 420a may be at least partially received in the housing portion 411. The cap 420 includes openings 416a that correspond to openings 416 so as to further receive fasteners 417. In such a manner openings 416 and 416A are aligned when the cap 420 is joined to the housing portion 411. In another embodiment, the openings 416a may be threaded. The cap 420 may further be attached to the housing portion 411 by a metal joining technique, such as, but not limited to brazing or welding. In another embodiment, the openings 416 and 416a may be omitted, and the cap 420 may be joined to the housing portion 411 by a metal joining technique, such as, but not limited to brazing or welding.

The coupling 430 is joined to the cap body 420a. In one embodiment, the coupling 430 is joined to the cap body 420a by a metal joining technique, such as, but not limited to, brazing or welding. In another embodiment, the coupling 430 is integral to the cap body 420a. The coupling 430 includes a recess 432 and an opening 433. The opening 433 traverses through the coupling 430 and recess 432. The opening 433 may receive to pin, bolt, or other fastener. In this exemplary embodiment, the coupling 430 is a standard power take-off (PTO) coupling. In an embodiment, the recess 432 is configured to receive a standard PTO (not shown), and the opening 433 receives a pin, bolt, or other fastener (not shown) for temporarily coupling the PTO to the tree stump removal device 400. The power take-off coupling may be connected to a rotational drive of a tractor, vehicle, post hole drill, drill or other power equipment.

Figure 4B:
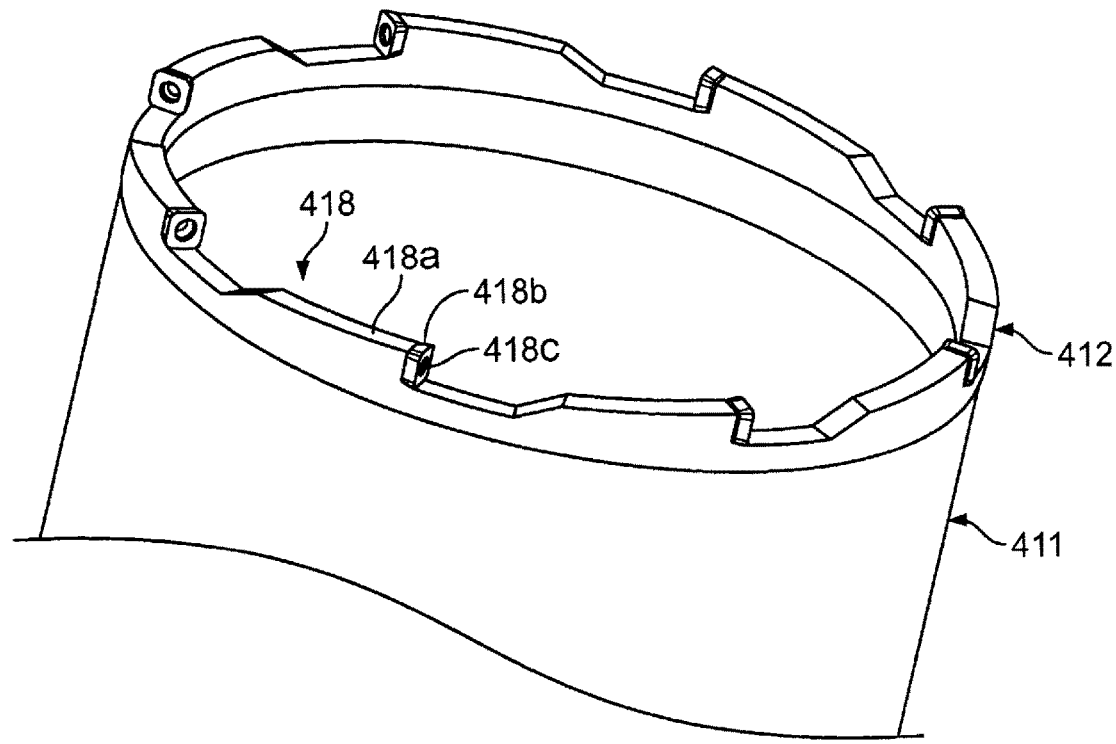
FIG. 4B is a partial perspective view of a bottom portion of the tree stump removal device of FIG. 4A.
Figure 4C:
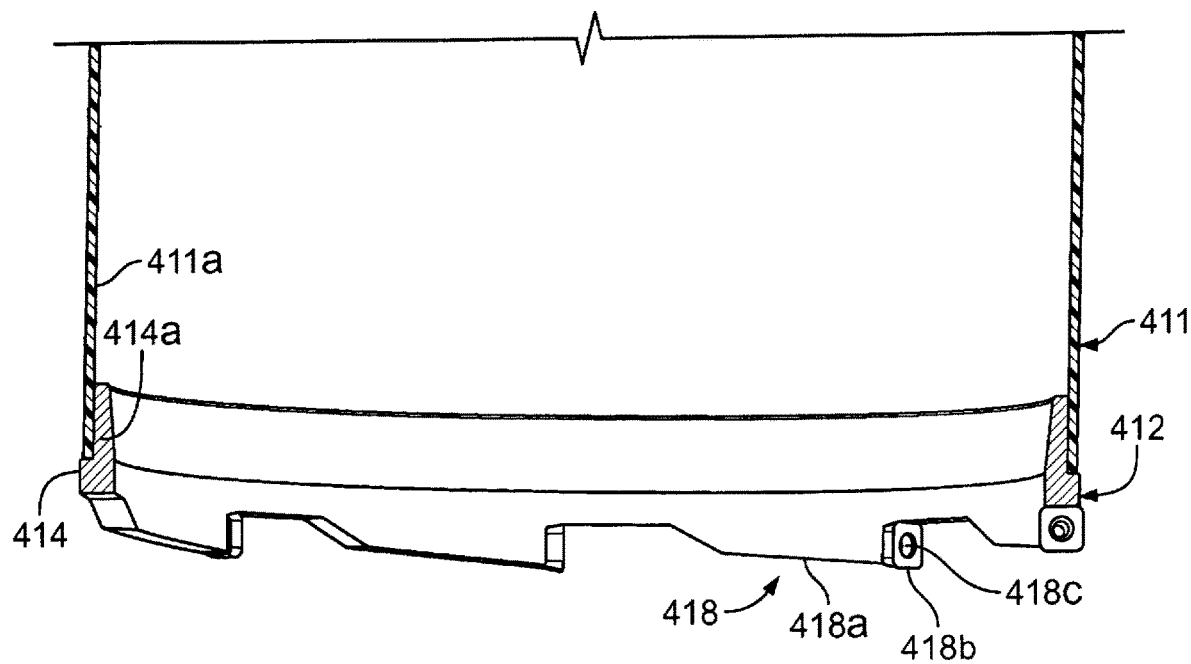
FIG. 4C is a partial sectional view of a bottom portion of the tree stump removal device of FIG. 4A.

Referring to FIGS. 4A, 4B and 4C, the cutting portion 412 includes a cutter portion body 414 and cutters 418. The cutter portion body 414 includes an insert portion 414a. The insert portion 414a is received in and along the inside wall 411a of housing portion 411. The cutter portion 412 is metallurgically joined to the housing portion 411 by a joining technique, such as, but not limited to brazing or welding. In another embodiment, the cutter portion 412 is mechanically fastened to the housing portion by a fastener, such as, but not limited to a pin, bolt, screw or clip.

In this exemplary embodiment, the cutter portion 412 includes eight cutters 418. In another embodiment, the cutter portion 412 may include one or more cutters 418. The cutters 418 include a cutter body 418a and a cutter insert 418b. The cutter body 418a is machined into the cutting portion 412.

The cutter insert 418b is formed of a cutter material. In one embodiment, the cutting insert 418b is formed of a hardened material. In one embodiment, the cutting insert 418b is a tungsten carbide insert. In another embodiment, the cutting insert 418b may be formed of a cermet, ceramic, metal, metal alloy or any combination thereof. The cutting insert 418b includes a through hole 418c through which a mechanical fastener (not shown) is inserted joining the cutting insert 418b to the cutter body 418a. The mechanical fastener may be a bolt, screw, or other like device. In one embodiment, the cutting insert 418b is releasably attached to the cutter body 418a, so the cutting insert 418b may be replaced when worn or broken. In another embodiment, the cutting insert 418b may be joined to the cutter body by a metallurgical bond, mechanical fastener, or combination thereof. In yet another embodiment, the cutting insert 418b is continuous part of a cutter 418, or in other words, the cutters 418 are a single, unitary body. In yet another embodiment, the cutter insert 418b may be omitted, and the cutters 418 may be hard faced with an appropriate hard facing material.

Figure 4D:
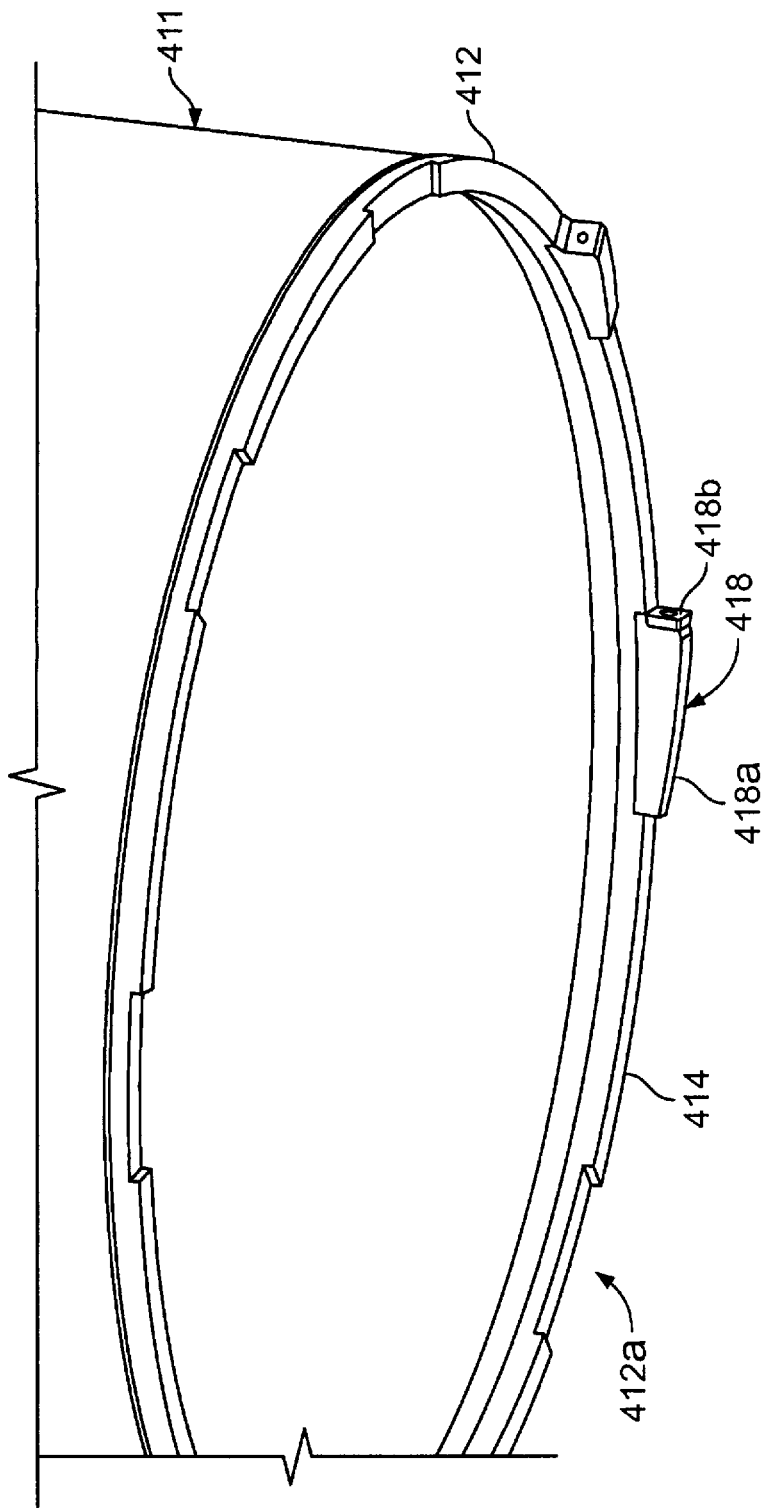
FIG. 4D is a partial perspective view of a bottom portion of another embodiment of a tree stump removal device according to the invention.
Figure 5A:
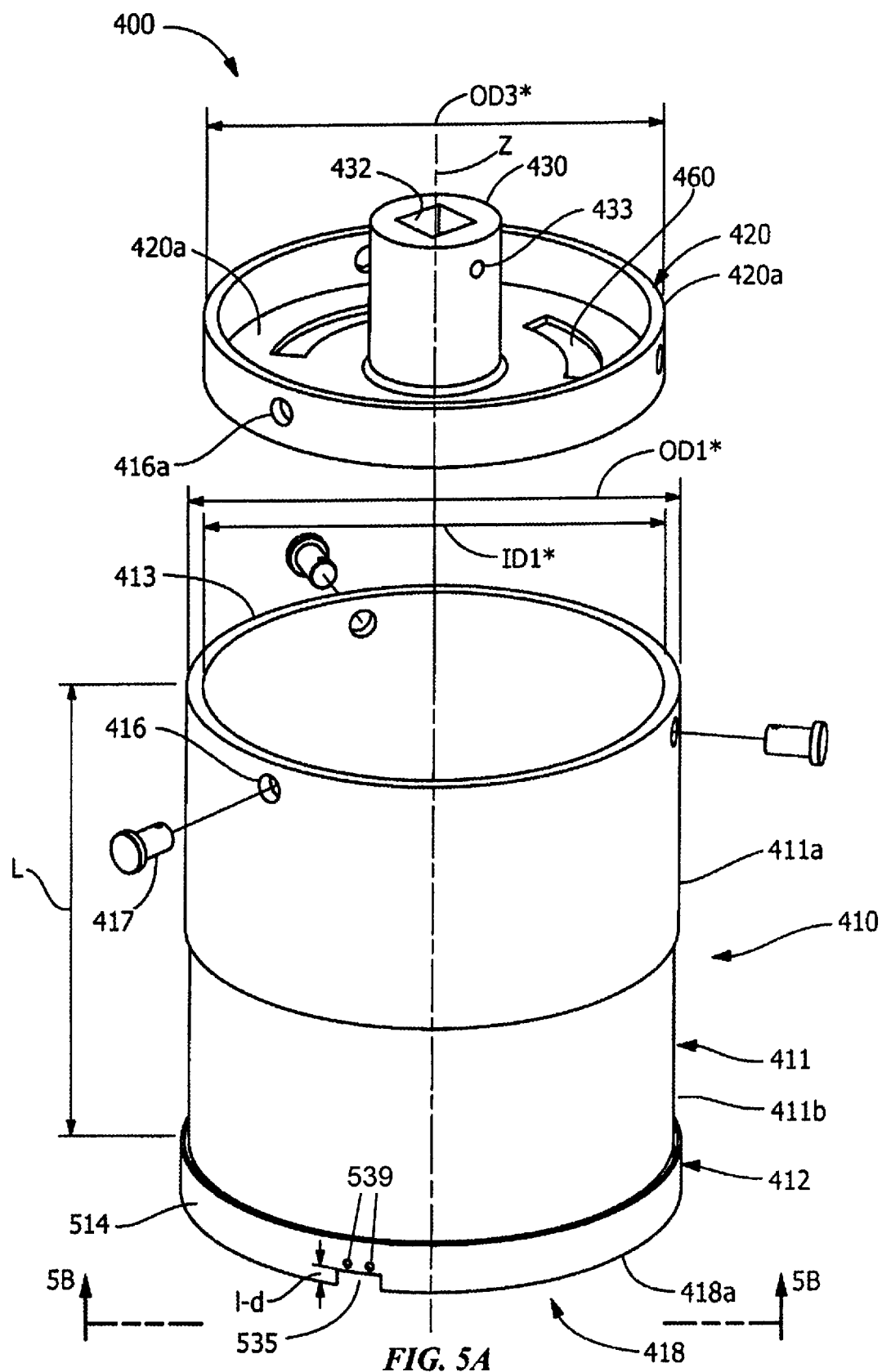
FIG. 5A depicts an embodiment of the present invention depicting a cutter portion body with notches for accepting a cutter assembly.
Figure 5B:
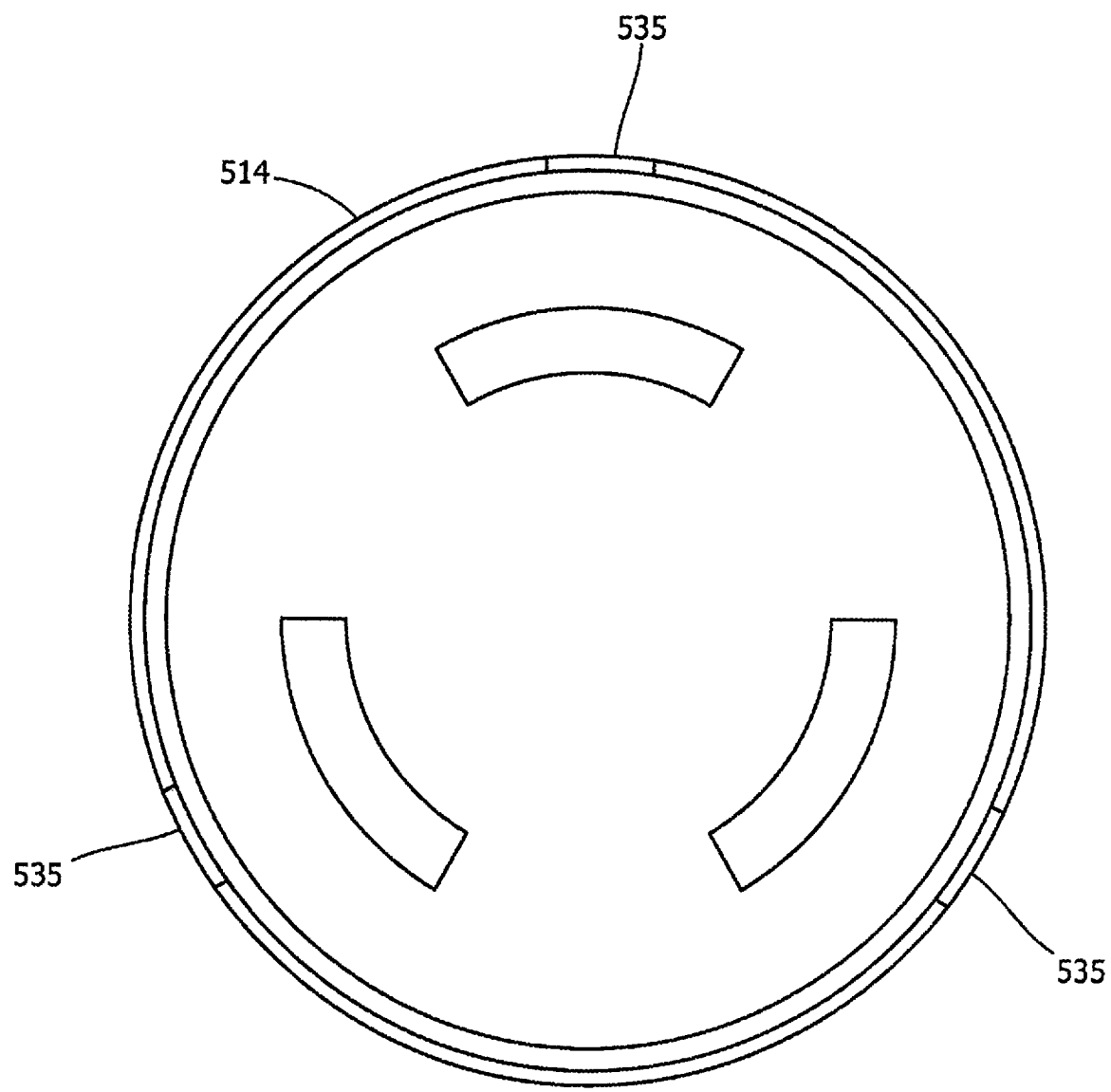
FIG. 5B depicts a bottom view of the cutter portion body of FIG. 5A viewed from the bottom.

FIG. 4D illustrates another embodiment of the cutter portion 412 and cutters 418. As can be seen in FIG. 4D, the cutter portion 412 includes a slot 412a for receiving cutters 418. The cutters 418 are metallurgically joined to the cutter portion 412 by a bonding technique, such as, but not limited to brazing or welding. In another embodiment, the cutter 418 is received in a housing slot 411b and joined to the cutting portion by a metallurgical and or mechanical joining technique. The mechanical joining technique may use a mechanical fastener, such as, but not limited to a screw, bolt or pin.

The cutters 418 include a cutter body 418a and a cutter insert 418b. The cutter body 418a may be formed of metal, metal alloy, ceramic, or composite. In one embodiment, the cutter body 418a may be formed of a hardened steel or aluminum. In one embodiment, the cutter insert 418b is tungsten carbide composite. In another embodiment, the cutter insert 418b may be formed of a cermet, ceramic, composite, metal, metal alloy or any combination thereof.

In an embodiment of a method of operating the tree stump removal device 400, the tree stump removal device 400 is coupled via coupling 430 to a mechanical rotary device (not shown), such as, but not limited to, a power take off of an industrial machine, such as, but not limited to, a tractor, post hole driller, drill, or other like device. In one embodiment, the tree stump removal device 400 is selected to have the main portion 411 having an inside diameter greater than the diameter of a tree stump selected for removal.

The tree stump removal device 400 is then placed over the tree stump. The rotary mechanical device is switched on so as to rotate the tree stump removal device 400 about the Z axis. The tree stump removal device 400 is then lowered towards the ground. The tree stump removal device 400 is continued to be lowered as the cutters 418 engage the ground and/or tree roots. The tree stump removal device 400 is lowered until the cutting portion 412 enters the ground to a desired depth. The desired depth is selected to sever some, most, or all of the roots of the stump horizontally extending therefrom. The tree stump removal device 400 is then raised from the desired depth and the severed tree stump is removed. In one embodiment, the tree stump is partially retained in the main portion 411 when the tree stump removal device 400 is raised. In another embodiment, tree stump removal device 400 includes a core screw 340 (FIG. 3A), and the tree stump is engaged by a core screw 340 and is partially retained in the main portion 411 when the tree stump removal device 400 is raised. In yet another embodiment, the tree stump remains in the ground after the tree stump removal device 400 has been raised, and the tree stump may be removed from the ground or left to decay in the ground.

FIGS. 5-9 depict a preferred embodiment of the tree stump removal device of the present invention. FIG. 5A depicts only the cutter portion body 514 of the body portion of the preferred embodiment, as the cap portion and the housing portion may assume any of the configurations depicted in the previously described embodiments depicted in FIGS. 1-4. In this embodiment, cutter portion body is integral with body portion 410. Cutter portion body 514 may be attached to housing portion 411 metallurgically, as previously described, or it may be machined as part of the body portion, forming for example a body portion fabricated as a single cylindrical piece. Cutter portion body 514 as shown in FIGS. 5A and 5B does not include any cutter assemblies or cutter inserts. Cutter portion body 514 includes a plurality of notches 535 machined into its lower circumference. The notches are formed in the circumference a distance of l–d from the bottom surface of cutter portion body. While a plurality of notches 535 may be formed in cutter portion body 514, three notches are preferred, as shown in FIG. 5B which is view of cutter portion body 514 from the bottom looking toward the cap. The notches may span any circumferential distance c. Also depicted in FIG. 5A is a radially oriented aperture 539. One aperture 539 is positioned above each of the plurality of notches 535 formed in cutter portion body 514.

Figure 7:
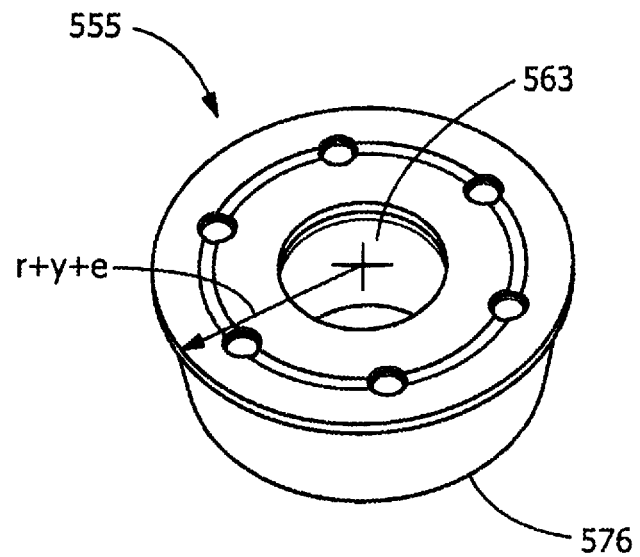
FIG. 7 depicts a cutter insert as part of the cutter assembly.

Referring now to FIGS. 6 and 7 are cutter holder and cutter insert 555. FIG. 6A is a side view of cutter holder 545. FIG. 6B depicts a front view of the cutter holder of FIG. 6A. Cutter holder 545 includes a pair of arms 547 extending from a base 549. Cutter holder has a length of l as shown in FIG. 6A, while the arms extend a distance of d toward a cutter holder base 549. The base thus has a size of l–d which corresponds to the notch dimension l–d depicted in FIG. 5A, so that base matches the notch, fitting into notch 535. Pair of arms 547 are separated by a distance t. Distance t corresponds to the thickness of the cutter portion body 514 which may vary from 100-500 mils (¹⁄₁₀-½ inch). Base 549 of cutter holder 545 further includes a countersink 551 which receives cutter insert 555. Countersink 551 has a radius r (and a diameter of 2r). Radius r is less than (l–d)/2 or 2r is less than (l–d). [(l–d)–2r] is a dimension that represents a wall thickness y of the countersink, that is [(l–d)–2r]=2y.

Countersink 551 further includes countersink aperture 553 which is threaded to receive a correspondingly threaded fastener. The preferred thickness of cutter portion body is about 0.25 inches. While the thickness of the cutter portion body may be reduced, as the thickness is reduced, the potential for damage to the cutter portion body due to deformation during tree stump removal increases. The thickness of the cutter portion body 514 may also be increased; however increasing its thickness, which increases rigidity, also increases weight, encumbering handling of the tree stump removal device. The dimensions are set forth as variables because the dimensions may have any physical sizes that meet these general parameters, and the invention should not be restricted to specific physical dimensions.

FIG. 7 provides a view of cutter insert 555. FIG. 7 provides a perspective view of cutter insert 555. It can be seen that cutter insert 555 is frustoconical in shape in the preferred embodiment. Cutter insert is dimensioned to fit into countersink 551 of cutter holder 545. Cutter insert 555, being frustoconical, has a major radius of r+y+e where e is a dimension no greater than 160 mils (0.160 inches) and a minor radius 576 less than r. Cutter insert 555 also includes a cutter aperture 563 corresponding to countersink aperture 553, allowing a threaded fastener to be inserted through cutter aperture and threaded into countersink aperture 553, thereby securing cutter insert 555 into countersink 551 of cutter holder. Since the minor radius of cutter insert 555 is less than r, the narrow end of cutter insert 555 fits into countersink 551 allowing cutter insert 555 to be secured within countersink 551 of cutter holder 545 by a fastener. The major radius of cutter insert 555 extends below cutter holder 545 by the dimension e, which is no greater than 160 mils, preferably no greater than 150 mils, and most preferably 50-125 mils. This dimension e represents the cutting edge of cutter insert 555. When the cutting edge represented by e is greater than about 160 mils, it has been found that any binding that occurs during tree stump removal can result in distortion or bending of the body portion when a body portion and cutter portion body have the preferred thickness of ¼ inch. Of course, increasing the thickness of the body portion when the cutting edge extends beyond 160 mils can alleviate this problem, providing a thicker and stiffer tool, but with increased weight and decreased handleability. Although cutter insert 555 is described in its preferred embodiment as having a frustoconical shape, one skilled in the art would recognize that cutter insert 555 may also be fabricated in other shapes, such as but not limited to a cylindrical part having a plurality of radii, a first radii at one end being smaller than radius r and a second radius at the opposite end sized to r+y+e. Cutter insert 555 preferably comprises a carbide tool steel although it may comprise a hard-faced part, where the hard faced material is a wear resistant material.

Figure 8:
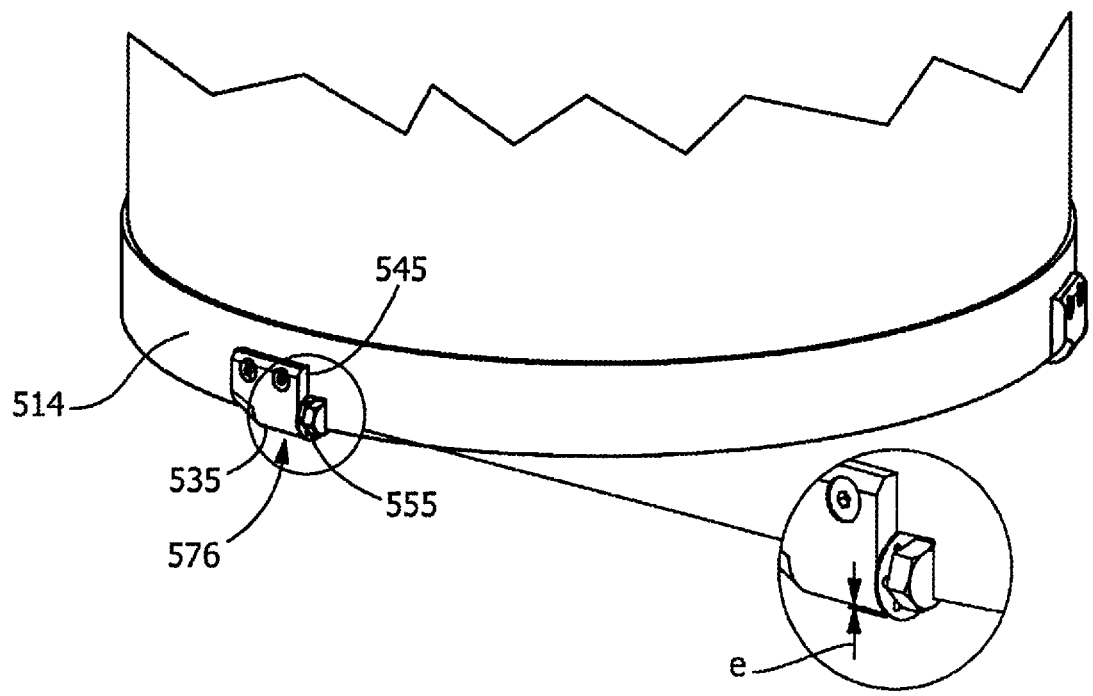
FIG. 8 depicts a cutter assembly comprising the cutter insert assembled to the cutter holder to form a cutter assembly and the cutter assembly assembled to the cutter portion body of the tree stump removal device.

FIG. 8 depicts cutter insert 555 assembled to cutter holder 545, and cutter holder assembled into a corresponding notch 535 of cutter portion body 514. The plurality of notches 535, which are radiused to correspond to the radius of the cutter portion body, slide over the cutter portion body 514 as one cutter holder 545 is assembled into each notch of the plurality of notches 535. A second aperture 554 extending through arms 547 of cutter holder 545 align with aperture 553 in cutter portion body 514, allowing cutter assembly 575 comprising cutter insert 555 and cutter holder 545 to be secured to cutter portion body 514. As can be seen from FIG. 8, cutting edge e of cutter insert 555 extends below cutter portion body 514. Once assembled, the major diameter (twice the radius) of cutter insert edge extends below cutter portion body perpendicular to the direction of rotation of the tool by a distance e which, as discussed may end extend up to 160 mils (0.160 inches) maximum.

This preferred design is easy to assemble and disassemble. It allows for ready replacement of the cutter inserts 555 as they wear, the cutter inserts experiencing most of the wear, while the cutter holder 545 and cutter portion body 514 experience very little wear allowing them to be used until they experience wear, which may be indefinitely. Surprisingly, this design also allows for easy removal of the tree stump after it has been extracted. As the cut around the tree stump is made, severing side roots, debris and soil accumulates between the stump and the inner diameter of the tree stump removal tool, compacting as the tree stump removal tool rotates. After all side roots have been cut, the stump and the compacted debris and soil are captured within the inner diameter of the tree stump removal tool. The stump eventually rotates with the tree stump removal tool and causes loosening or breaking of any tap root that may be present. The stump (along with the debris and compacted soil) may then be lifted out of the ground. With this preferred design, the tree stump and compacted soil and debris captured within the tree stump removal tool are readily removed by shaking the tree stump removal tool. The soil and debris are held tightly within the inner diameter by one of arms 547 for each cutter holder, but soil and debris are readily removed adjacent arms 547 by shaking, ultimately resulting in release of the stump from the tree stump removal tool.

Referring again to FIG. 6A and FIG. 6B, the countersink 551 is shown centered into cutter holder 545. One skilled in the art will understand that by slightly varying the dimensions of cutter holder 545, countersink 551 can be fabricated so that it is not centered but biased, either to the right or to the left of the configuration shown in FIG. 6A. Thus when assembled into notches 535, the cutting edge of cutter insert may extend downward but instead of being centered, either biased more toward the inside diameter of cutter portion body 514 or biased more toward the outside diameter of cutter portion body 514.

In one preferred embodiment in which three cutter inserts 555 are assembled to three cutter holders, one cutter insert 555 is centered in a cutter portion body 514 configured as shown in FIG. 8, one is biased more toward the inside diameter of cutter portion body 514 and one is biased more toward the outside diameter of cutter portion body 514. This embodiment provides a cut having a maximum kerf as compared to an assembly in which all cutter inserts 555 are oriented in cutter holders the same way.

The present invention has been described as a tree stump removal device, the tree stump removal device having preselected diameters up to 24 inches, and preferably from one foot (12 inches) to two feet (24 inches) in diameter. Although the tree stump removal device is described as limited to maximum sizes having diameters up to 24 inches, this limitation is related to costs, as the costs increase with increasing tree stump removal device diameter. Also, the stresses increase with increasing diameter, making it more likely for the tree stump removal device to bend during operation should binding occur unless the thickness of the cylindrical portion of the tool is increased as previously noted.

In many situations, a tree stump removal device is selected from among devices having a size range of the cutting diameter varies from 1-2 feet. A tree stump removal device with a cutting diameter larger than the cutting diameter of the tree stump, preferably with a cutting diameter about 2 inches larger than the diameter of the tree stump. As previously discussed, the tree stump removal device is comprised of a tubular body having a preselected length from a first end to a second end, the length generally being longer as the cutting diameter increases. A cap including a releasable coupling is attached to the first end of the tubular body of the tree stump removal device. Cutters are located at the second end of the tubular body opposite the releasable coupling.

A power rotational device is provided for attachment to the releasable coupling. Preferably, the power rotational device is self-propelled and includes a power take-off. The invention envisions a device such as a tractor, a payloader or other similar self-propelled device that can power rotation. The power rotational device is attached to the coupling either before or after the tree stump removal device is aligned over the tree stump. The cutters overlap at least some soil or debris adjacent to the tree stump and when the selected cutting diameter is larger than that of the tree stump, the cutter completely overlaps the tree stump and is aligned over the adjacent soil or debris.

Once power is applied, a circular slot is cut at least partially into the soil and debris surrounding the tree as the tree stump removal device is lowered. The tree stump removal device is lowered to a predetermined depth into the ground up to the preselected length of the tubular body, cutting any side roots emanating from the stump. As the tree stump removal device is lowered around the tree stump, debris such as cutting chips from any side roots and soil is captured and compacted within the inside diameter of the tubular body. This compacted soil and debris assists in maintaining the tree stump within the tree stump removal device as the device is lifted out of the ground by the power rotational device. After lifting the tree trunk out of the ground, it may be necessary to shake or otherwise vibrate the tree stump removal device to remove the stump and the compacted debris and soil from the inside diameter of the tubular body, as these are held in position by friction forces. Of course, before initiating any stump removal, the cutters should be examined for damage and to assure that they can provide the appropriate depth of cut. When the cutters are removable, cutters that do not pass the examination should be replaced when the cutters are mechanically removable. For metallurgically integrated cutters, the worn cutters should be cut off and new cutting inserts should be welded on, or new hard facing should be applied to the cutting surface.

Figure 9:
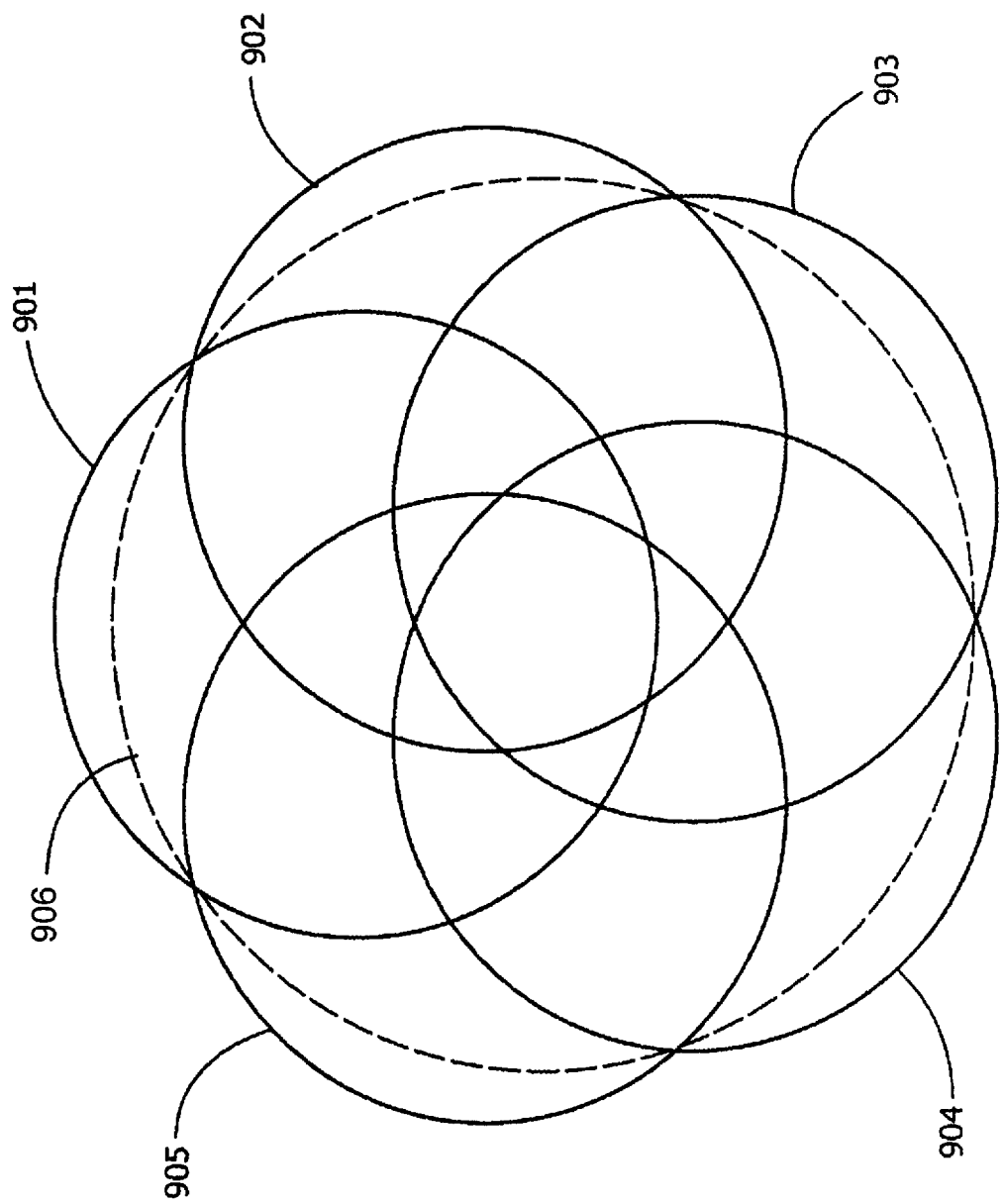
FIG. 9 represents a method for removing a tree stump having a diameter larger than the diameter of the tree stump removal device according to the invention.

However, a tree stump removal device within the specified range, up to 24 inches, can be used to remove stumps that are larger than the their maximum inside diameter. This is illustrated in FIG. 9. In FIG. 9, the tree trunk is represented by the circle 906 having the largest diameter. Also shown in FIG. 9 are five smaller circles 901-905. Each of the smaller circles represents the diameter of a tree stump removal device, the diameter of the tree stump removal device being smaller than the tree diameter. In this example, the tree stump is removed in five cuts, the first cut being made with circle 901 and the subsequent cuts being made sequentially and represented by circles 902, 903, 904 and 905. With each cut, a portion of the stump is cut and a cut is made in the soil adjacent to the cut. If there are any side roots, they are cut by the tree stump removal device. In each cut, soil and debris are compacted within tree stump removal device. After each cut is made, the cut stump and compacted debris are removed from the tree stump removal device by shaking the tree stump removal device before the next cut is initiated. This process is repeated until the tree stump has been removed, or at least has been removed to the depth of the tree stump removal device. A tree stump removal device having a cutting depth of at least two feet in usually enough to remove most stumps. If the stump cannot be removed with a tree stump removal device with this cutting depth, this cutting depth is sufficient to allow soil to be placed into the cut so that grass or other ground cover may be planted.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is claimed:

1. A method of removing a tree stump, comprising:
providing a tree stump removal device, the device further comprising a tubular body comprising a predetermined length extending from a first end to a second end and adapted to fit over at least a portion of the tree stump; a cap having a top and a bottom, the cap is attached to the first end, the cap including a releasable power take-off coupling extending vertically from the top of said cap and having a recess adapted to receive a power rotational device for rotating the tubular body said coupling further including an opening through said coupling that traverses said recess; said second end having one or more cutters connected to the second end of the tubular body adapted to cut into the ground around at least a portion of the tree stump and to sever roots from the tree stump; and the second end of the tubular body includes one or more notches adapted to receive the one or more cutters;
providing a power rotational device;
attaching the power rotational device to the coupling;
aligning the tree stump removal device over at least a portion of the tree stump so that the tree stump removal device overlaps both the tree stump and at least soil or debris adjacent to the tree stump;
cutting a circular slot with a tree stump removal device around the tree stump and into the adjacent soil or debris adjacent the tree stump by applying power to the tree stump removal device and lowering the tree stump removal device to a predetermined depth into ground around the tree stump; and
removing the tree stump removal device from the ground.

2. The method of claim 1 further comprising:
compacting soil or debris within the tubular body of the tree stump removal device;
lifting the tree stump and the compacted soil or debris from the ground.

3. The method of claim 1 wherein the step of cutting a circular slot around at least a portion of the tree stump and the adjacent soil or debris further severs roots extending away from the tree stump into the adjacent soil.

4. The method of claim 2 further including the additional step of vibrating or shaking the tree stump removal device to remove the tree stump, the compacted soil or the debris from the tubular body of the tree stump removal device.

5. The method of claim 1 wherein when a tree stump diameter is greater than a diameter of the cutting portion having one or more cutters at the second end of the tubular body, the steps of aligning, cutting, compacting, lifting and removing are repeated until the tree stump is removed, and cutting further includes cutting at least partially into the tree stump.

6. The method of claim 1 wherein the step of providing a tree stump removal device includes providing one or more mechanically removable cutters attached to the cutting portion of the second end of the tubular body, and further includes the additional steps of
inspecting the one or more cutters for damage and depth of cut;
mechanically removing and replacing one or more of the cutters or a part of the cutters attached to the second end of the tree stump removal device when the inspection discloses damage preventing the ability to cut or depth of cut below a predetermined minimum.

7. The method of claim 1 wherein the one or more cutters of the cutting portion comprise a replaceable cutter assembly.

8. The method of claim 7 wherein the cutter assembly further comprising a cutter holder and a replaceable cutter insert is attached to the cutter holder.

* * * * *